(12) United States Patent
Kawano et al.

(10) Patent No.: US 6,881,767 B2
(45) Date of Patent: Apr. 19, 2005

(54) FLON-RESISTANT RUBBER MODIFIED POLYSTRYRENE COMPOSITION

(75) Inventors: Koji Kawano, Sakai (JP); Kenichiro Matsuba, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 500 days.

(21) Appl. No.: 09/983,299

(22) Filed: Oct. 24, 2001

(65) Prior Publication Data

US 2002/0072570 A1 Jun. 13, 2002

(30) Foreign Application Priority Data

| Oct. 24, 2000 | (JP) | ........................................ 2000-323801 |
| Jan. 15, 2001 | (JP) | ........................................ 2001-006546 |
| Mar. 19, 2001 | (JP) | ........................................ 2001-078555 |

(51) Int. Cl.⁷ .............................................. C08L 83/00
(52) U.S. Cl. ........................ 523/201; 525/217; 525/223; 525/232; 525/238; 525/241
(58) Field of Search .......................... 523/201; 525/217, 525/223, 232, 238, 241

(56) References Cited

U.S. PATENT DOCUMENTS

| 3,644,587 | A | 2/1972 | Finberg |
| 4,513,111 | A | 4/1985 | Kishida et al. |
| 4,808,661 | A | 2/1989 | Iwamoto et al. |
| 5,861,455 | A | 1/1999 | Reddy et al. |
| 5,883,189 | A | 3/1999 | Eichenauer et al. |
| 5,883,190 | A | 3/1999 | Eichenauer |
| 6,657,010 | B2 * | 12/2003 | Kawano et al. ............. 525/217 |

FOREIGN PATENT DOCUMENTS

| EP | 0 458 773 | 11/1991 |
| EP | 0 671 436 | 9/1995 |
| EP | 0 902 047 | 3/1999 |
| GB | 1 180 085 | 2/1970 |
| JP | 08-012845 | 1/1996 |
| JP | 8-504450 | 5/1996 |
| WO | WO 94/12551 | 6/1994 |

* cited by examiner

*Primary Examiner*—Edward J. Cain
(74) *Attorney, Agent, or Firm*—Oblon, Spivak, McClelland, Maier & Neustadt, P.C.

(57) ABSTRACT

A rubber modified polystyrene composition comprising polybutadiene particles dispersed in polystyrene, wherein the polybutadiene particles have an average volume particle diameter of 6 to 13 microns, and the composition has a gel content of 25 to 35% by weight and a degree of swelling of 13 to 22, is prepared by polymerizing the polybutadiene particles in the presence of styrene. The rubber modified polystyrene composition of the present invention may be used for components contacting flon compounds, such as components of refrigerators.

13 Claims, 1 Drawing Sheet

FLON-RESISTANT RUBBER MODIFIED POLYSTRYRENE COMPOSITION

BACKGROUND OF THE INVENTION

1. Field of the Invention

The present invention relates to a rubber modified polystyrene composition having excellent environmental stress-crack resistance (ESCR) properties, and more specifically, it relates to a flon-resistant rubber modified polystyrene composition.

2. Description of the Prior Art

In general, rubber modified polystyrenes are moldable and have excellent physical properties, and are therefore suitable for use in various applications. However, conventional rubber modified polystyrenes have poor resistance to flon compounds (i.e., fluorocarbons) or oils, and for this reason, they tend to develop environmental stress cracks and other problems after being used only a short period of time.

Various rubber modified polystyrenes which have environmental stress-crack resistance properties when exposed to long chain oils or a fats have been studied, as described in Japanese PCT Patent Application Laid-Open No. 504450/1996 and Japanese Patent Application Laid-Open No. 12845/1996. These documents describe the oil resistance of rubber modified polystyrenes used in margarine containers, trays for a refrigerators, and the like. However, these documents do not describe polystyrenes having satisfactory flon-resistance properties.

When rubber modified polystyrenes are used as refrigerator liners, the physical properties of the polystyrene are noticeably impaired by the residual flon compounds used as foaming agents in the polyurethane foam which contacts the liner. Contact with these residual flon compounds causing cracking to occur in the polystyrene. In order to prevent such cracking, it is necessary to provide a flon-resistant material between the liner and the polyurethane, or to employ an expensive material such as an ABS resin which has flon-resistant properties. It is therefore desirable to develop a rubber modified polystyrene which itself has flon-resistant properties.

SUMMARY OF THE INVENTION

Accordingly, it is an object of the present invention to provide a rubber modified polystyrene composition having flon-resistant properties. The present inventors have found that the flon resistant properties of rubber modified polystyrene compositions depend on the average volume particle diameter, the gel content, and degree of swelling of the rubber particles in the composition.

DETAILED DESCRIPTION OF THE PREFERRED EMBODIMENTS

Figure 1:
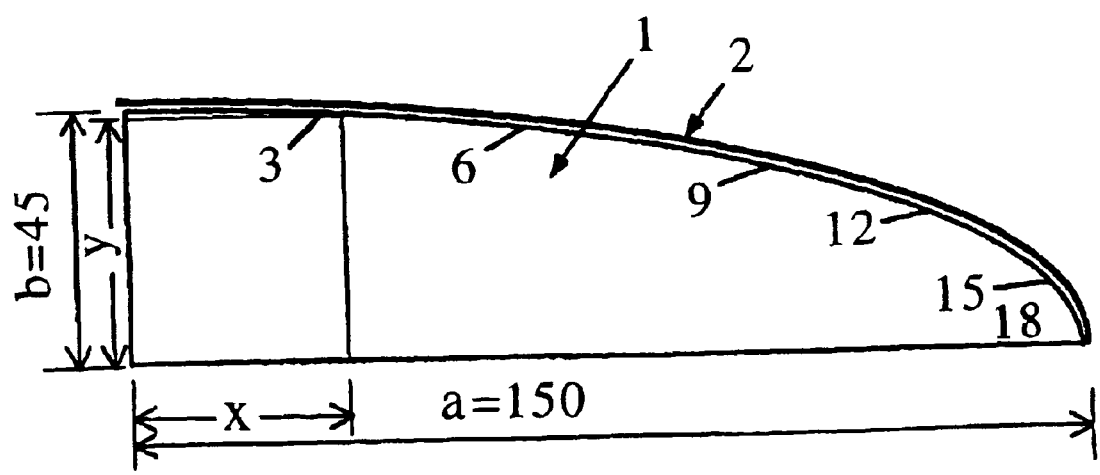
FIG. 1 is a ¼ ellipsoidal jig with a scale for visually observing the occurrence of a crazing or a crack on a sample of rubber modified polystyrene composition according to the present invention.

Thus, in a first embodiment, the present invention provides a rubber modified polystyrene composition comprising polybutadiene rubber particles dispersed in a polystyrene matrix, where the average volume particle diameter of the polybutadiene rubber particles is in the range of 6 to 13 μm, the gel content of the composition is in the range of 25 to 35% by weight, and the degree of swelling of the composition is in the range of 13 to 22.

The polybutadiene rubber component of the rubber modified polystyrene composition of the present invention may be any commercially available polybutadiene rubber, including polybutadiene homopolymers, for example 1,2-polybutadiene, 1,4-polybutadiene, combinations thereof, and cis and trans isomers thereof, and copolymers of butadiene with other suitable copolymerizable comonomers, for example polystyrene-butadiene rubbers and polybutadiene-acrylonitrile rubbers. The Mooney viscosity of the polybutadiene rubber component of the rubber modified polystyrene composition according to the present invention, measured at 100° C. (i.e., $ML_{1+4}(100°\ C.)$), is preferably in the range of 40 to 80, and a 5.43% by weight toluene solution of the polybutadiene rubber has a viscosity at 25° C. in the range of 50 to 300 centipoise. Examples of suitable polybutadiene rubbers include, for example NF55A (trade name, made by Asahi Chemical Industry Co., Ltd.), DIENE 55AC and 70AC (trademarks, made by Firestone Co., Ltd.), Taktene 550 and 710, Buna CB HX530 and Buna CB 1414 (trade names, made by Beyer AG), and BR 1220SU (trade name, made by Nippon Zeon Co., Ltd.).

The polystyrene phase of the rubber modified polystyrene composition is polymer of styrene or a styrene mixture containing at least one comonomer copolymerizable with styrene, preferably in an amount of 10% by weight or less. The matrix polystyrene preferably has a weight-average molecular weight in the range of 140,000 to 280,000. Preferably, the comonomer may include, for example, α-methylstyrene, acrylonitrile, methacrylonitrile, methyl acrylate, n-butyl acrylate, methyl methacrylate, maleic anhydride, maleimide, N-phenylmaleimide, methacrylic acid and mixtures thereof.

The rubber modified polystyrene composition of the present invention may be prepared by any suitable process, and is not limited to any particular method. For example, the rubber modified polystyrene may be prepared by conventional suspension polymerization or bulk polymerization methods, in which polystyrene is polymerized in the presence of polybutadiene rubber. Methods for preparing rubber modified polystyrene are described, for example, in Kirk-Othmer Encyclopedia of Chemical Technology, Fourth Edition, Volume 19, John Wiley & Sons, New York (1996) pages 860–862, and references described therein, herein incorporated by reference. Because polystyrene is immiscible with the polybutadiene rubber, during the polymerization, the polybutadiene rubber phase separates from the polystyrene matrix in the form of small particles of polybutadiene rubber suspended in the polystyrene matrix.

In order to regulate the molecular weight or rate of the polymerization, a molecular weight modifier such as a sulfur compound, or a reaction initiator such as a peroxide (e.g., organic peroxides such as benzoyl peroxide, cumyl peroxide, etc.), and azo compounds (e.g., azobisisobutyronitrile, etc.) may be added to the reaction mixture. In addition, solvents may also be added, for example for the purposes of reducing the viscosity of a polymerization solution, promoting heat transfer for the removal of polymerization heat, and preventing localized heating by promoting proper stirring. Examples of preferred solvents include benzene, toluene, ethylbenzene, xylene and mixtures thereof.

If the average volume particle diameter of the rubber particles of the compositions of the present invention is in the range of about 2 to 5 μm, no flon-resistant properties are observed, and therefore, rubber particle diameters of 6 μm or more are necessary. As the particle diameters increase, the flon-resistant properties of the rubber modified polystyrenes improve, but if the particle diameters are too large, the impact strength of the rubber modified polystyrenes deteriorates. Accordingly, the average volume particle diameter of the rubber particles is preferably 13 μm or less, more preferably in a range of 8 to 11 μm.

The gel content in the rubber modified polystyrene compositions of the present invention are in the range of 25 to 35 wt %.

It is preferred that the degree of swelling of the rubber modified polystyrene compositions of the present invention is large, but if the degree of swelling is too large, stiffness and impact resistance deteriorate. Accordingly, the degree of swelling is preferably in the range of 13 to 22, more preferably 14 to 20.

No particular restriction is put on techniques for removing unreacted monomer and solvent by devolatilizing the compositions of the present invention, but preferred methods subject the compositions of the present invention to the least possible heat history, because the degree of swelling decreases when the composition is subjected to a greater heat history.

The present invention will be described more in detail referring to the following examples and comparative examples.

The average volume particle diameter of a rubber modified polystyrene composition of the present invention, prepared by the procedure described above, was measured by a laser analysis type particle-size distribution measuring device.

The gel weight of rubber modified polystyrene compositions was measured as follows: 1 g of the rubber modified polystyrene composition was dissolved in 30 ml of a solution of methyl ethyl ketone/methanol, in a volume ratio of 20/3, followed by centrifugal separation of the undissolved portion of the composition from the dissolved portion of the composition. The resultant undissolved material was vacuum-dried, and then weighed to provide the gel weight (G, in units of grams). The gel content was calculated in accordance with the equation G/1×100 (%).

The degree of swelling was measured as follow: 0.4 g of the rubber modified polystyrene composition was dissolved in 20 ml of toluene, followed by centrifugal separation of the undissolved portion of the composition from the dissolved portion. The supernatant liquid was decanted, and the weight TG (in units of grams) of the undissolved gel was then measured. Next, the gel was vacuum-dried, and the weight DG (in units of grams) of the dried gel was then measured. The degree of swelling was calculated using the equation TG/DG.

As shown in FIG. 1, the flon-resistance properties of the rubber modified polystyrene composition were measured as follows: First, the rubber modified polystyrene composition was molded into a test piece having a width of 50 mm, a length of 150 mm and a thickness of 1.3 mm. The test piece was then attached to the ¼ ellipsoidal jig, 1, with a scale. Afterward, this jig was placed in a closed container having a volume of 11 liters, maintained at a constant temperature (23° C.) in a thermostatic chamber. A petri dish containing 50 ml of Flon 141b was also placed inside the closed container. After 16 hours, the jig, 1, was removed from the closed container, and the smallest graduation (n) was read at the position where crazing or cracking occurred on the test piece. Then, a critical strain (ε) was calculated in accordance with the following equation.

$$\varepsilon = \frac{bt}{2a^2}\left(1 - \frac{a^2-b^2}{a^4}X^2\right)^{\left(-\frac{3}{2}\right)}$$

wherein a is the length of the long axis (150 mm) of the ¼ ellipsoidal jig, b is the length of the short axis (45 mm) of the ¼ ellipsoidal jig, and t is the thickness (1.3 mm) of the test piece.

The formula of the ellipse was represented by X=a cos θ and Y=b sin θ, where the relation between eccentric angle θ, and n is as follows: n=(90−θ)/5, wherein the X axis is the long axis direction, and the Y axis is the short axis direction.

Thus, better flon-resistance is indicated by larger values of ε.

EXAMPLE 1

A rubber modified polystyrene composition having a gel content of 30.6 wt %, an average volume particle diameter of 9 μm and a degree of swelling of 14.3 was prepared by polymerizing styrene in the presence of DIENE 70AC (Firestone Co., Ltd.). No cracking was observed when the critical strain of a composition test piece was measured. The results are shown in Table 1.

EXAMPLE 2

A rubber modified polystyrene composition having a gel content of 27.3 wt %, a degree of swelling of 17.4, and otherwise the same as in Example 1, was prepared by polymerizing styrene in the presence of DIENE 55AC (Firestone Co., Ltd.). No cracking was observed when the critical strain of a composition test piece was measured. The results are shown in Table 1.

EXAMPLE 3

A rubber modified polystyrene composition was prepared by polymerizing styrene in the presence of polybutadiene, so that the polystyrene of the polystyrene phase had a weight-average molecular weight of 220,000, and other properties as shown in Table 1. No cracking was observed when the critical strain of a composition test piece was measured. The results are shown in Table 1.

EXAMPLE 4

A rubber modified polystyrene composition having a gel content of 28.2 wt %, an average volume particle diameter of polybutadiene of 8.8 μm and a degree of swelling of 16.0 was prepared by polymerizing styrene in the presence of BR 1220SU (Nippon Zeon Co., Ltd.). No cracking was observed when the critical strain of a composition test piece was measured. The results are shown in Table 1.

TABLE 1

|  | Example 1 | Example 2 | Example 3 | Example 4 |
|---|---|---|---|---|
| Gel Content (wt %) | 30.6 | 27.3 | 28.5 | 28.2 |
| Degree of Swelling | 14.3 | 17.4 | 15.5 | 16 |
| Average Volume Particle Diameter of Polybutadiene (μm) | 9 | 8.7 | 8.8 | 8.8 |
| Polystyrene Phase Molecular Weight (g/mol) | 158,000 | 155,000 | 220,000 | 180,000 |
| Critical Strain | No crack | No crack | No crack | No crack |

COMPARATIVE EXAMPLE 1

A rubber modified polystyrene composition having the properties shown in Table 2 was prepared with the same polybutadiene rubber as in Example 1. The critical strain of a test piece prepared from the composition, as described above, had a low value of 0.31. The results are shown in Table 2.

COMPARATIVE EXAMPLE 2

A rubber modified polystyrene composition having the properties shown in Table 2 was prepared with the same polybutadiene rubber as in Example 1. The critical strain of a test piece prepared from the composition, as described above, had a low value of 0.53. The results are shown in Table 2.

COMPARATIVE EXAMPLE 3

A commonly used rubber modified polystyrene composition having a gel content, a degree of swelling and an average volume particle diameter which were lower than in Examples 1 to 3 of Table 1, was prepared by polymerizing styrene in the presence of DIENE 55AC (Firestone Co., Ltd.). Attempts to measure the critical strain of a test piece prepared from this composition were unsuccessful because the surface of the test piece dissolved, and did not appear to possess any flon-resistance at all, making critical strain measurements effectively impossible. The results are shown in Table 2.

TABLE 2

|  | Comparative Example 1 | Comparative Example 2 | Comparative Example 3 |
|---|---|---|---|
| Gel Content (wt %) | 29.0 | 22.5 | 19.2 |
| Degree of Swelling | 12.8 | 14.7 | 12.5 |
| Average Volume Particle Diameter of Polybutadiene ($\mu$m) | 8.4 | 8.8 | 5.3 |
| Molecular Weight of Polystyrene Phase (g/mol) | 160000 | 160000 | 205000 |
| Critical Strain | 0.31 | 0.53 | Surface was Dissolved |

The rubber modified polystyrene compositions of the present invention have excellent flon-resistance properties. The physical properties of such compositions are not significantly affected by contact with flon compounds, for example, when such compositions are used as liners for a refrigerator, and no cracking occurs, thereby prolonging the life of the refrigerator.

The priority documents of the present application, Japanese Patent Application Nos. 2000-323801 filed Oct. 24, 2000, 2001-006546 filed Jan. 15, 2001, and 2001-078555 filed Mar. 19, 2001, are incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A rubber modified polystyrene composition comprising polybutadiene particles dispersed in polystyrene, wherein the polybutadiene particles have an average volume particle diameter of 6 to 13 microns, and the composition has a gel content of 25 to 35% by weight and a degree of swelling of 13 to 22.

2. The rubber modified polystyrene of claim 1, wherein the average volume particle diameter of the polybutadiene particles is 8 to 11 $\mu$m.

3. The rubber modified polystyrene of claim 1, wherein the degree of swelling is 14 to 20.

4. The rubber modified polystyrene composition of claim 1 wherein the polybutadiene rubber has a Mooney viscosity ($ML_{1+4}(100°$ C.)) of 40 to 80, and a 5.43% by weight toluene solution of the polybutadiene rubber has a viscosity at 25° C. of 50 to 300 centipoise.

5. The rubber modified polystyrene composition of claim 1, wherein the polystyrene has a weight-average molecular weight of 140,000 to 280,000.

6. The rubber modified polystyrene composition of claim 1, wherein the polybutadiene rubber is a butadiene homopolymer.

7. The rubber modified polystyrene composition of claim 1, wherein the polybutadiene rubber is a copolymer of butadiene with styrene, acrylonitrile, and mixtures thereof.

8. The rubber modified polystyrene composition of claim 1, wherein the polystyrene is a polystyrene homopolymer or a polystyrene copolymer.

9. The rubber modified polystyrene composition of claim 8, wherein the polystyrene homopolymer has a weight-average molecular weight of 140,000 to 280,000.

10. The rubber modified polystyrene composition of claim 8, wherein the polystyrene copolymer comprises 10% by weight or less of at least one comonomer.

11. The rubber modified polystyrene composition of claim 10, wherein the comonomer is a monomer selected from the group consisting of α-methylstyrene, acrylonitrile, methacrylonitrile, methyl acrylate, n-butyl acrylate, methyl methacrylate, maleic anhydride, maleimide, N-phenylmaleimide, methacrylic acid and mixtures thereof.

12. A refrigerator comprising the rubber modified polystyrene composition of claim 1.

13. A component of a refrigerator comprising the rubber modified polystyrene composition of claim 1.

* * * * *

UNITED STATES PATENT AND TRADEMARK OFFICE
CERTIFICATE OF CORRECTION

PATENT NO. : 6,881,767 B2
DATED : April 19, 2005
INVENTOR(S) : Kawano et al.

It is certified that error appears in the above-identified patent and that said Letters Patent is hereby corrected as shown below:

<u>Title page</u>
Items [45] and [*] Notice, should read as follows:
-- [45] Date of Patent: *Apr. 19, 2005

[*] Notice: Subject to any disclaimer, the term of this patent is extended or adjusted under 35 U.S.C. 154(b) by 500 days.

This Patent is subject to a terminal disclaimer. --.

Signed and Sealed this

Twenty-second Day of November, 2005

JON W. DUDAS
*Director of the United States Patent and Trademark Office*